United States Patent
Tamura

[11] 3,861,790
[45] Jan. 21, 1975

[54] DYNAMIC VISUAL ACUITY TESTING SYSTEM

[76] Inventor: Raymond M. Tamura, 218 Lagoon Dr., Honolulu, Hawaii 96819

[22] Filed: Feb. 14, 1973

[21] Appl. No.: 332,261

[52] U.S. Cl.............. 351/17, 351/30, 351/36, 351/39
[51] Int. Cl............................. A61b 3/02
[58] Field of Search............ 351/1, 17, 30, 31, 36, 351/39

[56] References Cited
UNITED STATES PATENTS
| | | | |
|---|---|---|---|
| 1,454,774 | 5/1923 | Tillyer | 351/17 |
| 2,273,091 | 2/1942 | DeSilva | 351/1 X |
| 3,737,217 | 6/1973 | Haines | 351/30 X |

Primary Examiner—Paul A. Sacher
Attorney, Agent, or Firm—Dennison, Dennison, Townsend & Meserole

[57] ABSTRACT

Changing visual stimuli are presented on a screen for viewing by a subject to be tested. The visual stimuli are accompanied by audio instructions relative to what is being viewed and what is to be discerned by the subject. The subject's manually controlled reaction to the changing visual stimuli is physically recorded on a test card in conjunction with a time record and synchronized physical recording of the changing visual stimuli to provide a printed comparison between the actual changing condition of the stimuli and the subject's interpretation or reaction to the stimuli.

11 Claims, 11 Drawing Figures

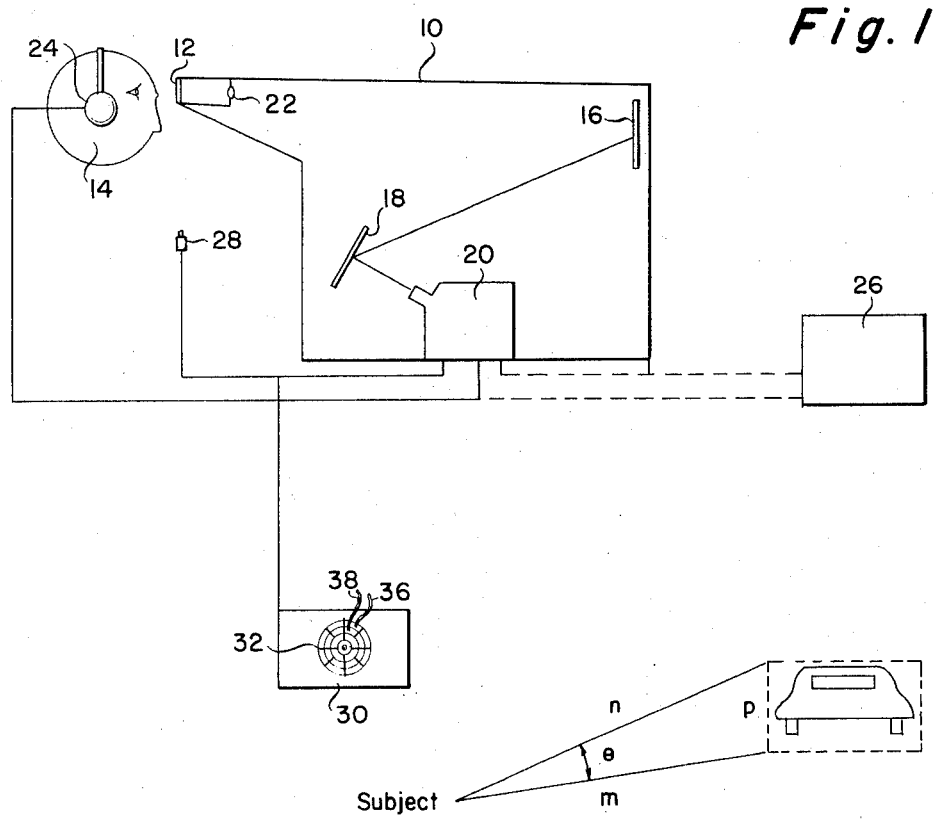
Fig. 1
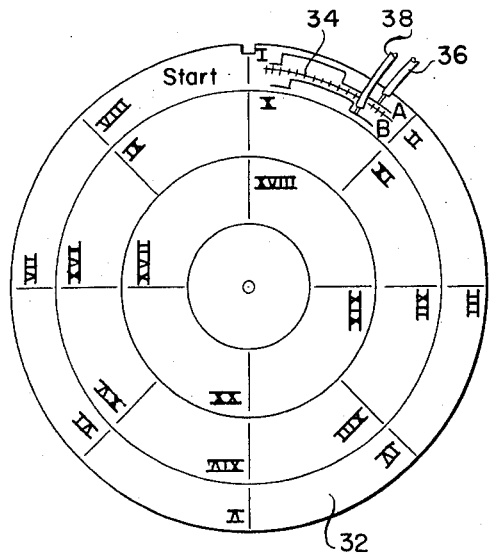
Fig. 2
Fig. 3

Fig. 4
Increasing Size
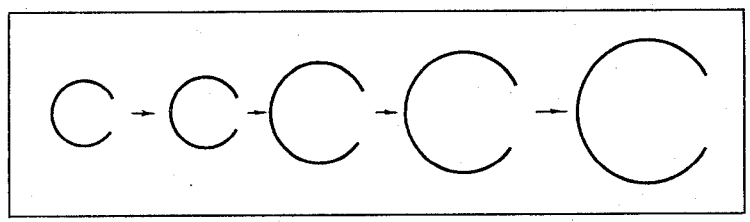
Fig. 5
Increasing Angle
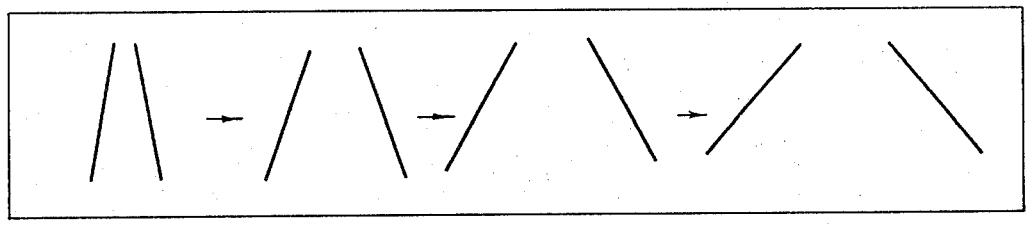
Increasing Size
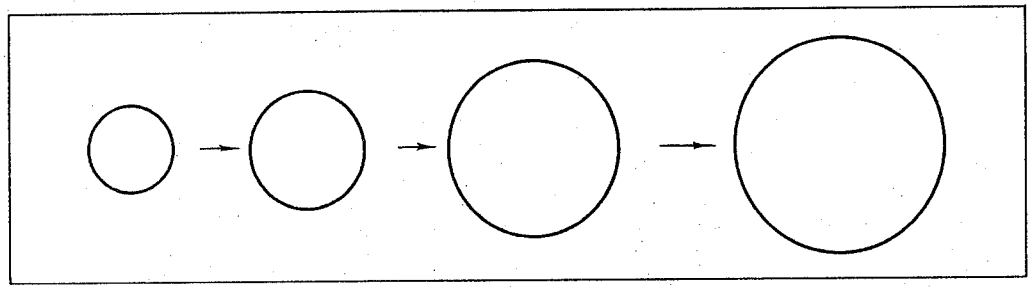
Fig. 6
Fig. 7
Increasing Size
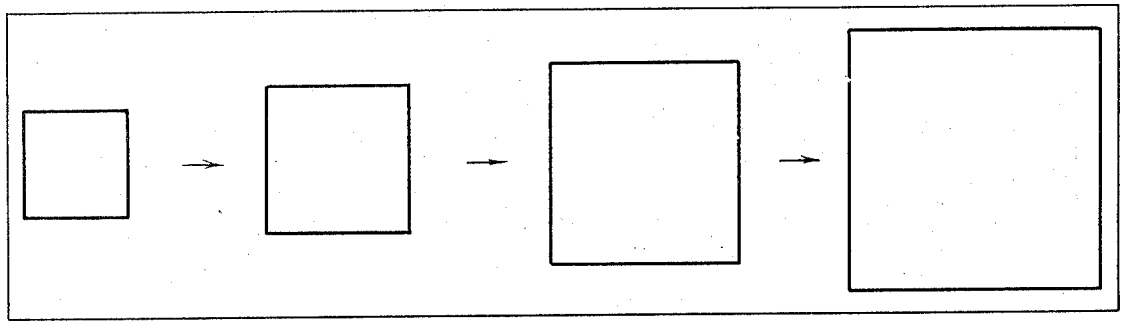

Increasing Size
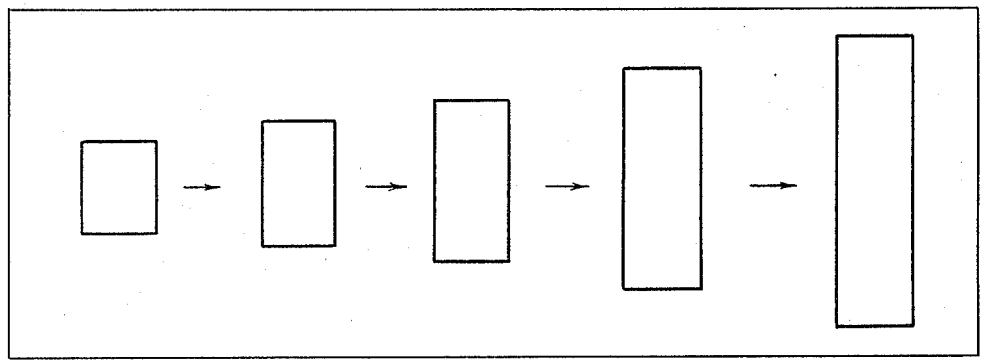
Fig. 8
Decreasing Size
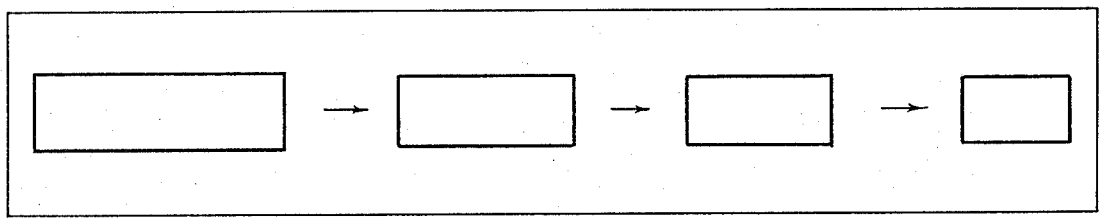
Fig. 9
Fig. 10
Decreasing Angle To Right Parallelogram Targets
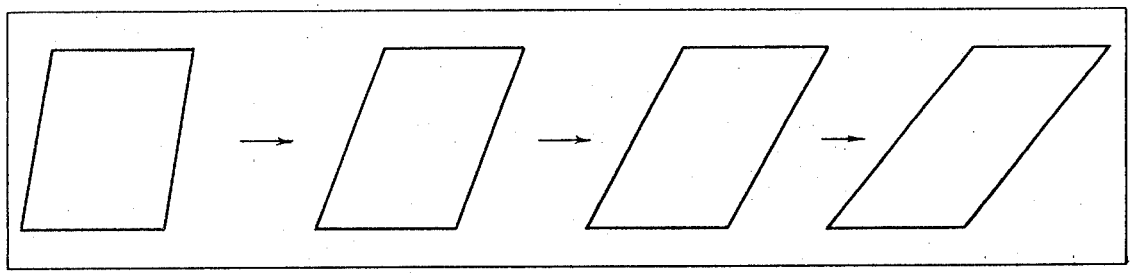
Fig. 11
Trapezoid Targets-Increasing Base Angles
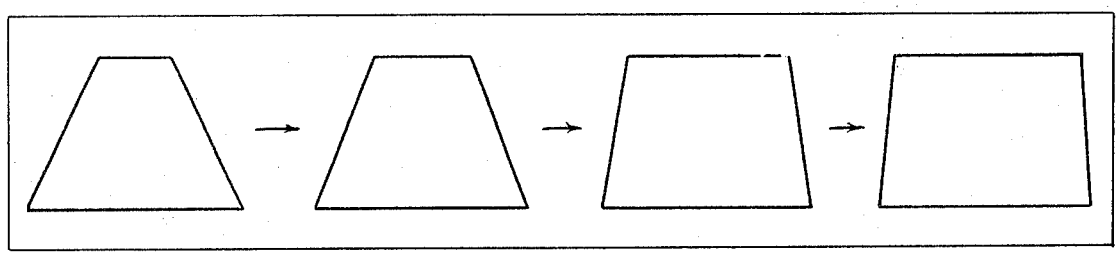

DYNAMIC VISUAL ACUITY TESTING SYSTEM

This invention generally pertains to visual testing and more specifically relates to a system for testing and recording a subject's ability to discriminate changes in visual stimuli, particularly changes in visual sizes and angles.

The capacity of an individual to discern changes in visual sizes and angles is a significant factor in a determination of his visual capability and his suitability for the performance of a variety of tasks, primarily, although not exclusively, the operation of vehicles of every type, including automobiles, trucks, ships, hovercraft, airplanes, aerospace vehicles, etc. Thus, a significant consideration in the present invention is the provision of a system which produces a physical record of subject's ability to note or be cognizant of changes in visual angles or the like with the data obtained being capable of correlation with other information to fit man in his machine and environment with better efficiency; that is, to select, train and upgrade vehicular operators.

It should be noted that "visual angle" as used herein is not the same as the visual angle defined classically in textbooks of ophthalmology, optometry, physiology, psychology or human factor engineering. It is used herein as the angle subtended by the object, target or perspective lines, angles, curves, etc. The subject's conceptual eye forms the vertex of the angle.

As an example of the use of the data from this testing, such data will be used in the Shannon Wiener measure of information:

$H = P_1 \text{Log}^2 1/P_1 + P_2 \text{Log}_2 1/P_2 + \ldots + P_i \text{Log}_2 1/P_i + \ldots + P_m \text{Log}_2 1/P_m$ which will be derived into:

$Dp(H) = [\text{Log}_2 1/P_1 - \text{Log}_2 e] + [\text{Log}_2 1/P_2 - \text{Log}_2 e] + \ldots + [\text{Log}_2 1/P_i - \text{Log}_2 e] + \ldots + [\text{Log}_2 1/P_m - \text{Log}_2 e]$ Data from this testing will also be used in the equation for Brownian motion, the following being an expansion of this equation and the role of the testing device:

$P(m,n,s+1) = \frac{1}{4} [P(m+1,n,s) + P(m-1, n,s) + P(m,n+1,s) + P(m,n-1,s)]$ $$m = \text{internal parameters of subject} = \begin{bmatrix} A_{11}A_{12} & \ldots & A_{1n} \\ A_{21}A_{22} & \ldots & A_{2n} \\ \vdots & & \vdots \\ A_m^1 A_m^2 & & A_{mn} \end{bmatrix}$$
Intellectual Factor $$+ \begin{bmatrix} B_{11}B_{12} & \ldots & B_{1n} \\ B_{21}B_{22} & \ldots & B_{2n} \\ \vdots & & \vdots \\ B_m^1 B_m^2 & & B_{mn} \end{bmatrix} + \begin{bmatrix} C_{11}C_{12} & \ldots & C_{1n} \\ C_{21}C_{22} & \ldots & C_{2n} \\ \vdots & & \vdots \\ C_{m1}C_{m2} & & C_{mn} \end{bmatrix}$$
Physiologic Factor    Psychological Factor $$+ \begin{bmatrix} D_{11}D_{12} & \ldots & D_{1n} \\ D_{21}D_{22} & \ldots & D_{2n} \\ \vdots & & \vdots \\ D_{m1}D_{m2} & & D_{mn} \end{bmatrix} + \ldots$$
Psychomotor Factor $$n = \text{external parameters of subject} = \begin{bmatrix} a_{11}a_{12} & \ldots & a^1_n \\ a_{21}a_{22} & \ldots & a^2_n \\ \vdots & & \vdots \\ a_{m1}a_{m2} & & a_{mn} \end{bmatrix}$$
Interpersonal Factor $$+ \begin{bmatrix} b_{11}b_{12} & \ldots & b_{1n} \\ b_{21}b_{22} & \ldots & b_{2n} \\ \vdots & & \vdots \\ b_{m1}b_{m2} & \ldots & b_{mn} \end{bmatrix} + \begin{bmatrix} c_{11}c_{12} & \ldots & c_{1n} \\ c_{21}c_{22} & \ldots & c_{2n} \\ \vdots & & \vdots \\ c_{m1}c_{m2} & \ldots & c_{mn} \end{bmatrix}$$
Cultural Factor    Family Factor $$+ \begin{bmatrix} d_{11}d_{12} & \ldots & d_{1n} \\ d_{21}d_{22} & \ldots & d_{2n} \\ \vdots & & \vdots \\ d_{m1}d_{m2} & \ldots & d_{mn} \end{bmatrix} + \ldots$$
Employment Factor The measurements of dynamic visual acuity, in terms of the cosine of the angle and its first and second derivatives and the rapidity with which the subject can detect changes in these quantities are to be used in the matrix which denotes Psychomotor Factor. For example, the subject's test card will show the interval of time it took him to detect the onset of change, and the time it took him to detect the cessation of change. Since $D_{11}$, $D_{12}$, $D_{1n}$, $D_{21}$, $D_{22}$, etc. denote a ratio which defines Bayes Theorem, which is $$P(c_i|E) = \frac{P(c_i) \cdot P(E|c_i)}{\sum_{j=1}^{s} P(c_j) P(E|c_j)}$$

then $D_{11}$ or any number of the matrix will be equal to $P(c_j \mid E)$. Thus, the time interval required to detect onset of change will be denoted by $P(c_j \mid E)$. The time interval required to detect cessation of change will be denoted by $P(E \mid c_j)$. $P(c_j)$ is the probability of detecting change as determined by population norms.

An example of visual angle as used herein is the angle formed by an automobile as viewed from the back (not FIG. 2 of the drawings).

The automobile is enclosed by the enclosing rectangle formed by the dashed lines. To simplify illustration, only the height of the rectangle is considered. The height of the rectangle is designated p. The subject's conceptual eye subtends an angle, $\theta$, as he views the automobile. The sides of the angle are designated m and n. The law of cosines as utilized is as follows:

$\cos \theta = m^2 + n^2 - p^2/2mn = m/2n + n/2m - p^2/2mn$

The first derivative of this equation will give a measure of velocity gradient:

$D_t(\cos \theta) = \delta(\cos \theta)/\delta m \, dm/dt + \delta(\cos \theta)/\delta n \, dn/dt + \delta(\cos \theta)/\delta p \, dp/dt$ where $\delta(\cos \theta)/\delta m = m^2 - n^2 + p \, p^2/2m^2 \, n$ ; $\delta(\cos \theta)/\delta n = n^2 - m^2 + p^2/2mn^2$ ; $\delta(\cos \theta)/\delta p = p/mn$ ∴ $D_t(\cos \theta) = (m^2 3 1 \, n^2 + p^2/2m^2n) \, dm/dt + (n^2 - m^2 3 0 \, p^2/2mn^2) \, dn/dt - (p/mn) \, dp/dt$ The second derivative of the cosine law will give a measure of acceleration gradient:

$D_t^2(\cos \theta) = d/dt \, (\delta \cos \theta/\delta m) \, dm/dt + \delta \cos \theta/\delta m \, d^2m/dt^2 + d/dt \, (\delta \cos \theta/\delta n) \, dn/dt + \delta \cos \theta/\delta n \, d^2n/dt^2 + d/dt \, (\delta \cos \theta/\delta p) \, dp/dt + \delta \cos \theta/\delta p \, d^2p/dt^2$ ∴ $D_t^2(\cos \theta) = (m^2 3 1 \, n^2 + p^2 \, /2m^2n) \, (d^2m/dt^2) + (n^2 - p^2/m^3n) \, (dm/dt)^2 + (2 \, p/m^2n) \, (dm/dt) \, (dp/dt) - (m^2 + n^2 + p^2/m^2n^2) \, (dn/dt) \, (dm/d) + (m^2 - p^2/mn^3) \, (dn/dt)^2 + (2p/mn^2) \, (dp/dt) \, (dn/dt) - (1/mn) \, (dp/dt)^2 + (n^2 - m^2 + p^2/2mn^2) \, (d^2 \, n/dt^2) - (p/mn) \, (d^2p/dt^2)$ Targets used in the testing device will be various sizes, shapes and configurations and will change at different rates. The maximum and minimum rates of change will be determined by setting the first and second derivatives equal to zero and solving for $m$, $n$ and $p$. Targets will test for objects as viewed by central and peripheral vision as well as perspective vision.

The apparatus utilized to obtain the requisite data basically includes a screen on which the stimuli or targets are projected by means of a projector and film strips; prerecorded audio-instructions, either on a voice track on the film strips or on tape played on a tape player synchronized with the projector; a variable optical system to adjust for distant or near vision; and test result recording means for providing a printed readout of the test results.

Other objects, advantages and novel features of the invention will become apparent from the following detailed description when taken in conjunction with the accompanying drawings, wherein:

FIG. 1 is a schematic illustration of the testing apparatus utilized in accordance with the principles of the present invention;

FIG. 2 schematically illustrates the visual angle as defined in conjunction with the testing procedures herein;

FIG. 3 illustrates a preferred form of test result recording card; and

FIGS. 4 through 11 diagrammatically suggest examples of stimuli to be used.

Referring now more specifically to the invention, the apparatus includes a viewing chamber or enclosure 10 provided with a viewing port or window 12 through a wall thereof at a position which allows the subject 14, normally seated, to conveniently look therethrough. Aligned with the window, and along the line of sight of subject 14, is a screen 16 on which the stimuli or targets are to be projected, preferably through a series of mirrors and/or prisms 18, from projector 20 also located within the enclosure 10.

An appropriate variable optical system 22 will be mounted immediately inward of the viewing window 12 and adjustable for distant and near vision in accordance with the particular test and stimuli involved. It is contemplated that the primary testing will be concerned with binocular vision, however each eye of the subject seated outside of the enclosure can be occluded if necessary.

The subject is provided a listening device 24, normally one or two earphones, through which he receives audio instructions either from the sound track of the target film within projector 20 or a separate tape player 26 synchronized with the projector 20.

The continuing reaction of the subject to the changing stimuli, as indicated by the manual manipulation of the push buttom signal 28 by the subject, is recorded by appropriate recording apparatus 30 on a recording disc or card 32.

Noting FIG. 3, the recording card 30 will be divided into segments labeled I, II, III, IV, etc. Each segment will be utilized in conjunction with a separate target or stimuli group and have a time scale 34 appearing thereon divided into 0.1 second intervals.

The recording apparatus 30 will receive the card 32 and record the desired data thereon adjacent to the re-recorded time scale 34 utilizing two separate styli 36 and 38. The stylus 36 will be synchronized with the projected target and automatically record, by deviations in a curved line, the target changes. This is presented in line A. The second sytlus 38, producing line B, is under the manual control of the subject 14 through push button 28, and will deviate as soon as the buttom 28 is pressed. Stylus 38 remains offset as long as the button 28 is depressed. When the button 28 is released, stylus 38 returns to the original line, the subject normally being required to depress the button when he notes a target change and release the button when the target change stops.

When the test is completed, the interval between the initial target change and the subject's detection of the change can be measured in 0.1 second increments. The interval between cessation of the target change and subject's perception thereof is also measured. This will give an objective measure of the subject's ability to detect alterations in dynamic visual angular cues.

Samples of the stimuli or target sequencing to be used are illustrated in FIGS. 4–11. As will be appreciated, the sequencing can involve increasing or decreasing the size, angle, etc., with each particular target presentation usually involving both an increasing sequence and a decreasing sequence. The subject is required to detect the sequence changes at the earliest possible moment. It is the ability to detect changes rapidly which separates the good, average and poor driver, pilot, astronaut, etc.

In use, the subject is seated and looking through a viewing port while the optical system 22 is moved into a first position. This will be structured so that is will give target presentation either at near or distance. When the optical system is swung to a second position, it will give a presentation opposite from that of the first position. The subject will wear the earphones and receive instructions therethrough.

As the machine is switched on after subject dons his earphones, instructions will be given as to what is expected of him. For example, instructions will be: "You will see a series of targets presented to you such as this. (Samples of targets will be shown on the screen). The object of this test is to see if you can notice a change in the targets as soon as possible. This target (Landolt C, FIG. 4) has a space which will widen like this. (Show changes in target). This target (angled lines, FIG. 5) has an angle which will change by widening and narrowing. (Show angle widening and narrowing). This target (complete circle O, FIG. 6) changes size. (Show circle enlarging and diminishing). This target is a square (FIG. 7) which will become larger and smaller. (Show square enlarging and diminishing). This target is a rectangle which will become larger and smaller in this way (show changes in height, FIG. 8), and larger and smaller in this way (show changes in width, FIG. 9). This target is a parallelogram (FIG. 10) which will change in this way (show changes in configuration by moving base to subject's right and then to his left). This target is a trapezoid (FIG. 11) which will change like this (show base moving to subject's rignt and to his left), and which will also increase or decrease in size (show proportionate changes in size). The purpose of this test is to see how quickly you can see these changes. As soon as you notice a change in the target, press the button in your hand. As soon as the change stops, release the button."

After the subject has been properly instructed as above, the testing will proceed. It will of course be appreciated that many variations of the above specifically referred to sequencing can be used. Further, depending on the particular subject or sequencing used, the instructions can, rather than being presented in their entirety prior to the testing, be separately presented prior to each sequence. After the data has been obtained from the testing, it will, as previously indicated, be used for correlation with other information to accurately determine the capabilities of the individual.

I claim:

1. Apparatus for visual testing of a subject comprising: visually presented stimuli having a sequentially changing visual angle, means for allowing a viewing of the stimuli by the subject, first recording means for automatically recording the changing of the stimuli, and second recording means manually controlled by the subject for recording the reaction of the subject to the changing of the stimuli, and a time passage indicator common to a record provided by the first recording means and a record provided by the second recording means, said time passage indicator comprising visible indicia divided into equal time intervals, the records provided by said first and second recording means being visible, generally coextensive and positioned generally adjacent, parallel, and along said time passage indicator for a visual comparison therewith.

2. The apparatus of claim 1 including a viewing screen, film projection means directed toward said screen, said stimuli being in the nature of projected pictures on said screen.

3. The apparatus of claim 2 including audio means associated with the film projection means and in information transmitting contact with the subject.

4. The apparatus of claim 3 including a variable optical system interposed between the subject and the screen and adjustable for distant or near vision.

5. The apparatus of claim 1 including audio means associated with the visually presented stimuli and in information transmitting contact with the subject.

6. The apparatus of claim 1 including a variable optical system interposed between the subject and the visually presented stimuli adjustable for distant or near vision.

7. The apparatus of claim 1 wherein said projected pictures sequentially and progressively differ from each other so as to provide, with the subject's conceptual eye forming the vertex, the changing visual angles.

8. The apparatus of claim 1 wherein the stimuli are defined by a series of graphic presentations sequentially and progressively differing from each other in size so as to provide, with the subject's conceptual eye forming the vertex, the changing visual angles.

9. The apparatus of claim 1 wherein the stimuli are defined by a series of graphic presentations sequentially and progressively differing from each other in angularity so as to provide, with the subject's conceptual eye forming the vertex, the changing visual angles.

10. A method of determining the ability to detect dynamic visual angular changes in testing for dynamic visual acuity including the steps of placing before the subject stimuli comprising a sequentially changing visual angle defined as the angle subtended by a target with the subject's conceptual eye forming the vertex of the angle, maintaining an automatic continuing record of the changing visual angles, the subject, through manually controlled means producing a record of his interpretation of the changing visual angles, maintaining a time record coextensive with the record of the changing visual angle and the interpretation thereof and correlating the three records to determine ability to discriminate changes in visual stimuli, the step of placing before the subject stimuli comprising placing before the subject a series of similar graphic presentations sequentially and progressively differing from each other in size so as to provide, with the subject's conceptual eye forming the vertex, the changing visual angles.

11. A method of determining the ability to detect dynamic visual angular changes in testing for dynamic visual acuity including the steps of placing before the subject stimuli comprising a sequentially changing visual angle defined as the angle subtended by a target with the subject's conceptual eye forming the vertex of the angle, maintaining an automatic continuing record of the changing visual angles, the subject, through manually controlled means producing a record of his interpretation of the changing visual angles, maintaining a time record coextensive with the record of the changing visual angle and the interpretation thereof and correlating the three records to determine ability to discriminate changes in visual stimuli, the step of placing before the subject stimuli comprising placing before the subject a series of similar graphic presentations sequentially and progressively differing from each other in angularity so as to provide, with the subject's conceptual eye forming the vertex, the changing visual angles.

* * * * *